United States Patent [19]

Keren

[11] Patent Number: 5,046,843

[45] Date of Patent: Sep. 10, 1991

[54] METHOD AND APPARATUS FOR MEASURING THE THREE-DIMENSIONAL ORIENTATION OF A BODY IN SPACE

[75] Inventor: Eliezer Keren, Arad, Israel

[73] Assignee: Rotlex Optics Ltd., Doar Na Arava, Israel

[21] Appl. No.: 566,576

[22] Filed: Aug. 13, 1990

[30] Foreign Application Priority Data

Aug. 11, 1989 [IL] Israel ............................ 91285

[51] Int. Cl.$^5$ ................. G01B 11/26; G01C 1/00
[52] U.S. Cl. .................... 356/152; 356/150; 356/374
[58] Field of Search ............... 356/363, 374, 150, 152

[56] References Cited

U.S. PATENT DOCUMENTS

| | | | |
|---|---|---|---|
| 3,269,254 | 8/1966 | Cooper et al. | 356/150 |
| 4,105,339 | 8/1978 | Wirtanen | 356/152 |
| 4,583,852 | 4/1986 | Cassidy et al. | 356/152 |
| 4,836,681 | 6/1989 | Saders et al. | 356/374 |

*Primary Examiner*—Stephen C. Buczinski
*Attorney, Agent, or Firm*—Benjamin J. Barish

[57] ABSTRACT

A method and apparatus measuring the orientation of the body in space with respect to first, second and third orthogonal axes, by projecting a collimated beam of light onto a non-axially-symmetrical mirror carried by the body in space; directing the light beam reflected from the mirror through an instrument measuring beam deflections or curvatures; and measuring the beam deflections or curvatures about the three axes to determine the orientation of the body in space.

15 Claims, 6 Drawing Sheets

SIDE VIEW OF GRATING TWO SETS OF STRIPES AT 90°

METHOD AND APPARATUS FOR MEASURING THE THREE-DIMENSIONAL ORIENTATION OF A BODY IN SPACE

FIELD AND BACKGROUND OF THE INVENTION

The present invention relates to a method and apparatus for measuring the orientation of a body in space with respect to the three orthogonal axes. Existing two-dimensional apparatus are commonly called autocollimators.

Figure 1:
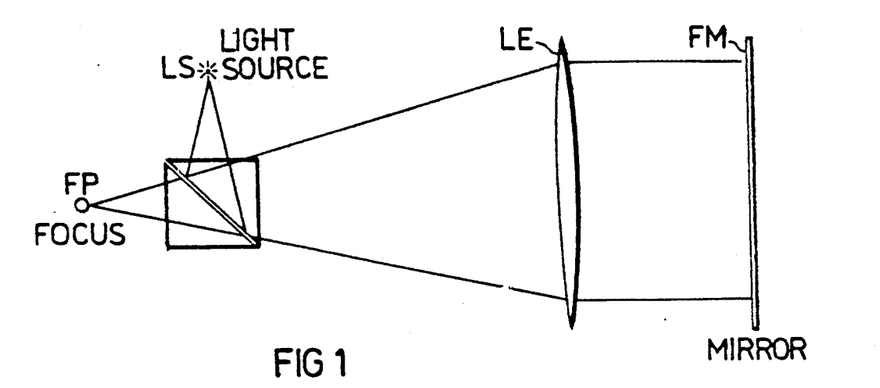
FIGS. 1–8 are diagrams and fringe patterns helpful in explaining the apparatus described herein constructed in accordance with the invention.

The most common configuration of autocollimator employs an expanded collimated light beam which is reflected off a flat mirror attached to the object. The reflected beam is focused by a lens, and the lateral displacement of the focal point is proportional to the angular displacement of the mirror (FIG. 1). Defining the optical axis (the z-axis) perpendicular to the reference plane of the mirror, the focal point deviations in the x- and y-directions indicate tilts of the mirror around the y-axis and x-axis, respectively.

The reflected beam cannot be used to detect angular displacement in the third dimension, namely rotation around the z-axis. To detect such an angular displacement, a second autocollimator must be used at a right angle to the first. This possibility is impractical when measuring at large distances, or when the object can be accessed from one direction only.

OBJECTS AND SUMMARY OF THE INVENTION

An object of the present invention is to provide to a method and apparatus for the simultaneous measurement of all three angles of rotation using a single beam travelling in one direction.

According to a broad aspect of the present invention, there is provided a method for measuring the orientation of a body in space with respect to first, second and third orthogonal axes, comprising: projecting a collimated beam of light onto non-axially-symmetrical mirror means carried by said body in space; directing the light beam reflected from said mirror means through an instrument measuring beam deflections or curvatures; and measuring said beam deflections or curvatures about said three axes to determine the orientation of the body in space with respect to said three axes.

The method is particularly applicable where the instrument is one based on the "moire deflectometry" technique for measuring beam deflections or curvatures. Such an instrument is capable of measuring small angular deviations at a high accuracy. When such an instrument is used, the measuring of the beam deflections or curvatures is effected by measuring the average fringe shift to determine the angle of the body with respect to the first orthogonal axis; measuring the fringe density or orientation to determine the angle of the body with respect to the second orthogonal axis; rotating the two gratings 90°; and repeating the measurement of the fringe shift to determine the angle of the body with respect to the third orthogonal axis.

While the invention is described below particularly with respect to this type of instrument, it will be appreciated that other instruments for detecting directional angular displacements could be used, as will be briefly referred to below.

In the described preferred embodiment, the mirror means comprises a cylindrical mirror. It will be appreciated, however, that other non-axially-symmetrical mirrors could be used, for example ellipsoidal mirrors or astigmatic mirrors.

A further embodiment of the invention is described below wherein the mirror means incudes both a cylindrical mirror and a flat mirror; and a still further embodiment is described wherein the mirror means includes two flat mirrors at an angle to each other.

The invention also relates to apparatus for practising the above method.

As will be describe below, utilizing a method and apparatus in accordance with the above features enables the simultaneous measurement of all three angles of rotation using a single beam travelling in one direction.

Further featues and advantages of the invention will be apparent from the description below.

BRIEF DESCRIPTION OF THE DRAWINGS

The invention is herein described, by way of example only, with reference to the accompanying drawings, wherein.

THEORETICAL DISCUSSION

As mentioned earlier, the novel method and apparatus of the present invention may be implemented using various types of instruments for beam deflections or curvatures. A preferred instrument for this purpose is based on the technique called "moire deflectometry", since such an instrument is capable of measuring small angular deviations at a high accuracy. Such instruments have been used in two-dimensional autocollimators. The present invention enables their use in three-dimension autocollimators, namely for the simultaneous measurement of all three angles of rotation using a single beam travelling in one direction. However, the following description of the use of a moire deflectometer as a two dimensional autocollimator will serve as an introduction to the technique and as a framework for its extension to the third dimension.

FIG. 1 as briefly mentioned above, illustrates an expanded collimated light beam from a light source LS reflected off a flat mirror FM, attached to the object whose space-orientation is to be measured. The reflected beam is focussed by a lens LE. The lateral displacement of the focal point FP is proportional to the angular displacement of the mirror FM.

Figure 2:
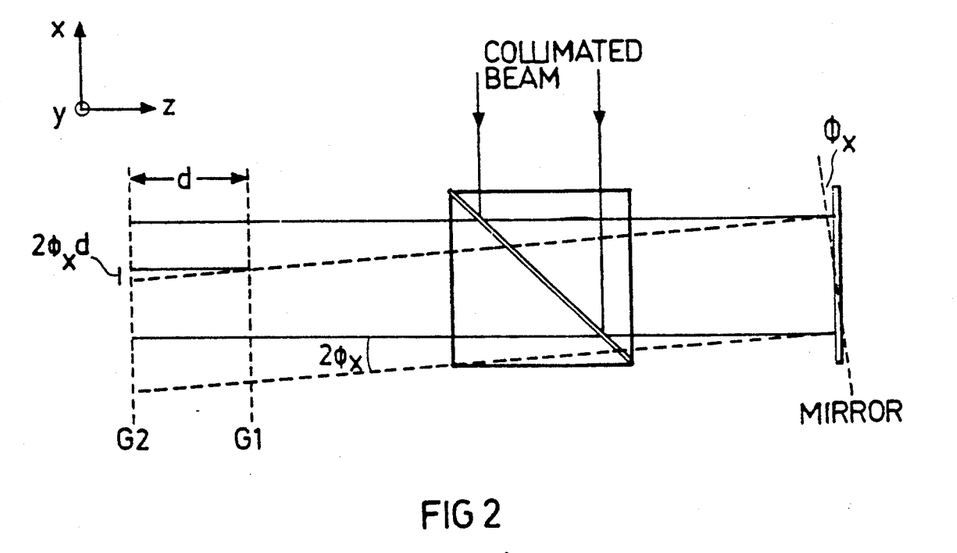

FIG. 2 more particularly illustrates the collimated beam reflected off the flat mirror and then directed through a deflectometer having two square wave gratings, $G_1$ and $G_2$, of pitch p. These gratings are placed in the path of the reflected beam so that both are perpendicular to the optical axis. In the configuration illustrated in FIG. 2, the stripes of both gratings run parallel to one another and the y-axis, and are separated by a distance d. When the beam direction is exactly parallel to z, the shadow of $G_1$ coincides with the stripes of $G_2$ so that half of the incident intensity is transmitted through the grating pair.

Let the mirror be tilted slightly through an angle $\phi_x$ around the y-axis so that the reflected beam is deflected by an angle $2\phi_x$ in the x-direction. The shadow of $G_1$ is shifted in the x-direction by an amount $2\phi_x d$. (Small angles are assumed here and throughout this description.) Consequently, the fraction of transmitted light decreases from $\frac{1}{2}$ to $\frac{1}{2}-2\phi_x d/p$) until at $\phi_x = p/4$ d, no light is transmitted. When the tilt angle $\phi_x$ exceeds $p/4$ d, the intensity increases and eventually varies periodically with $\phi_x$.

Figure 3:
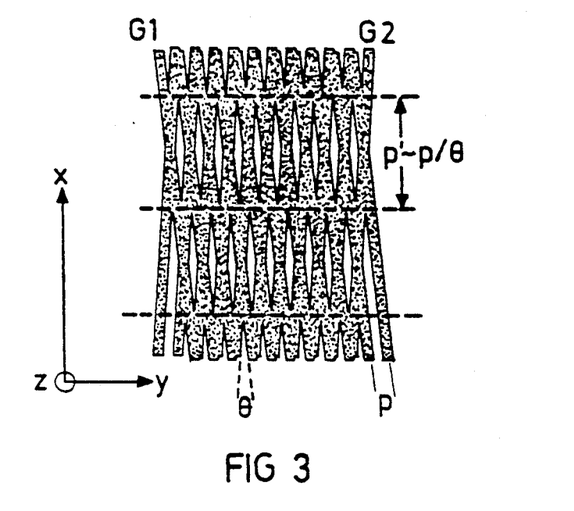

A slight modication of the above "infinite fringe" situation involves rotating the two gratings in opposite directions through the same angle $\theta/2$ around the optical axis. The transmitted intensity comprises a pattern of straight "finite" fringes parallel to the x-axis and separated by a constant gap $p'=p/\theta$ (FIG. 3). A tilt $\phi_x$ in the mirror will shift the fringes in the y-direction by an amount $\Delta y = 2\phi_x/d\theta$.

Thus, counting the number of times that the light transmission varies from maximum to minimum in the infinite fringe mode, or monitoring fringe displacements in the finite fringe mode allows measurement of the tilt angle $\phi_x$. Note that the sensitivity of the device is proportional to the grating separation d. All commercial moire deflectometers are equipped with distance adjustments which allow easy tuning of the sensitivity from the arc second range to several degrees. The tilt $\phi_y$ in the y-direction is evaluated by rotating the grating pair through 90° and repeating the measurement as above.

Before turning to the third dimension it is instructive to describe an application of moire deflectometry to the measurement of an object with variable slopes. Consider the concave spherical mirror of radius R illustrated in FIG. 4. The surface is represented by, $$z = R - (R^2 - x^2 - y^2)^{\frac{1}{2}} \approx \frac{x^2 + y^2}{2R} \tag{1}$$

Figure 4:
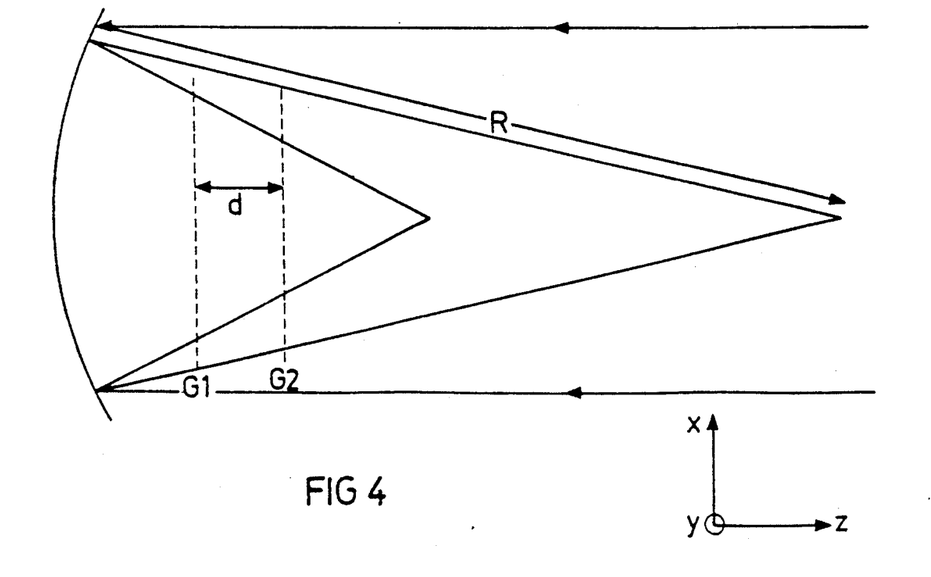

The slope is, $$\phi_x = \frac{\partial z}{\partial x} \approx \frac{x}{R} \tag{2}$$

The deflection angle is proportional to x so that in the infinite fringe mode we have straight equidistant fringes of separation $p'=Rp/2$ d. In the finite fringe mode we get oblique fringes of the form, $$\Delta y = \frac{2d}{R\theta} x \tag{3}$$

where $\Delta y$ is the deviation of the fringe from its original position obtained with a flat mirror. This position is alos the intersection of the fringe with the y-axis (at $x=0$). Both methods of operation allow us to calculate the radius of curvature R of the spherical surface.

Figure 5:
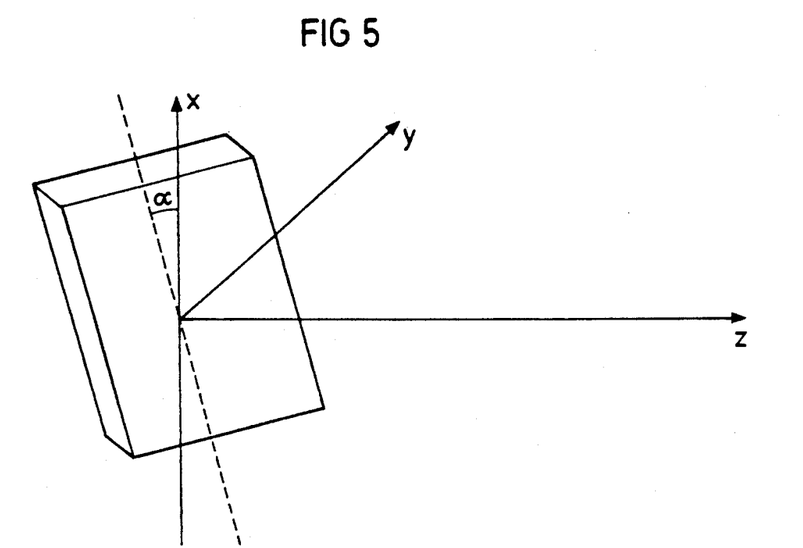

FIG. 5 illustrates how this method is extended to the third dimension. Let $\alpha$ denote the angular displacement of an object around the z-axis relative to the x-axis. If we attach to the object a mirror whose radius of curvature depends on the direction $\alpha$, we can measure $\alpha$ indirectly from the variation of the fringe slope 2 $d/R(\alpha)\theta$ in Eq. 3. The most obvious choice is a cylindrical mirror of radius r tilted by an angle $\alpha$ to the x-axis. Its surface is represented by, $$z = r - [r^2 - (x \sin \alpha + y \cos \alpha)^2]^{\frac{1}{2}} \approx \frac{(x \sin \alpha + y \cos \alpha)^2}{2r} \tag{4}$$

The cylinder is positioned such that when $\alpha=0$, the slope in the x-direction is zero.

Differentiating Eq. 4 with respect to x yields:

$$\frac{\partial z}{\partial x} = \frac{x \sin^2 \alpha + y \sin \alpha \cos \alpha}{r} \tag{5}$$

Eq. 5 can be used to determine $\alpha$, but to simplify the notation we assume once again the small angle approximation. Collecting only the term linear in $\alpha$ we get, $$\frac{\partial z}{\partial x} \approx \frac{y\alpha}{r} \tag{6}$$

Comparing Eq. 6 with Eq. 2 we see that apart from being linear in y instead of x, the fringe pattern of the cylindrical mirror behaves like that of a spherical mirrow with curvature, $$1/R = \alpha/r. \tag{7}$$

Namely, the curvature is proportional to $\alpha$. The cylindrical version of Eq. 3 for the fringe deviation is, $$y = \frac{2\alpha y d}{r\theta}, \tag{8}$$

so the slope of $\Delta y$ vs. y may be used directly to calculate the twist angle $\alpha$.

Similarly, $\alpha$ can be calculated from the variation of fringe spacing in the infinite fringe mode.

The sensitivity of the method is, $$\frac{\Delta y}{\alpha} = \frac{2yd}{r\theta} \tag{9}$$

in fringe shift/radian, or dividing by the unperturbed fringe spacing $p'=p/\theta$, we get: sensitivity $=2$ yd/rp fringe/radian.

Figure 6:
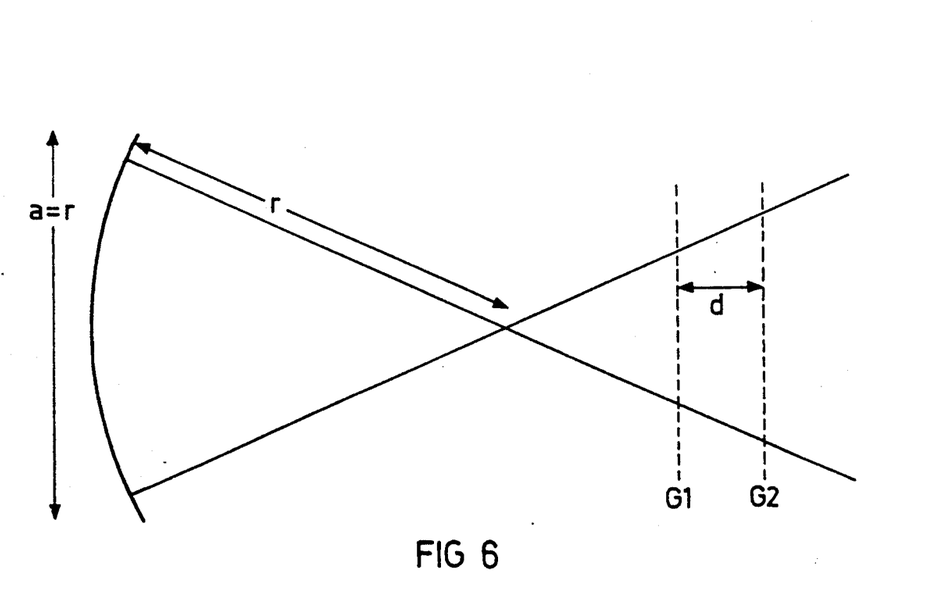

This value can be compared to the sensitivity of the two dimensional autocollimator to the tilts $\alpha_x$ and $\alpha_y$, which is equal to 2 d/p fringes/radian. If we choose a cylindrical mirror with a diameter $a=r$ (FIG. 6), then the fringe shift between the two extremes $y=\pm a/2$ is the same as the fringe shift we would observe for $\phi_x$ across a flat mirror of the same diameter. In other words, a mirror of R-number equal to 1 has the same sensitivity in all three axes. Changing the grating separation detunes the sensitivity of the three modes of rotation simultaneously. When the observation is constrained in numerical aperture, for instance when measuring at large distances, the sensitivity to the twist motion will be poorer than the two lateral tilt motions in inverse proportion to the R-number.

Figure 7:
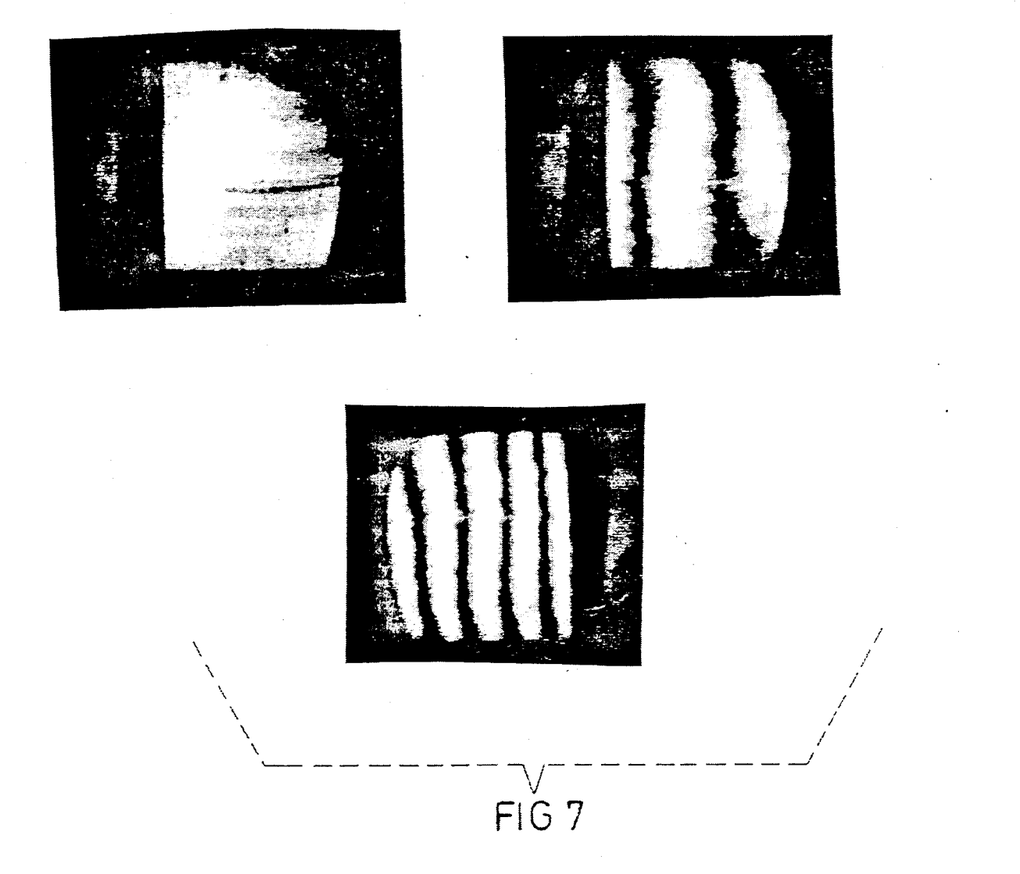
Figure 8:
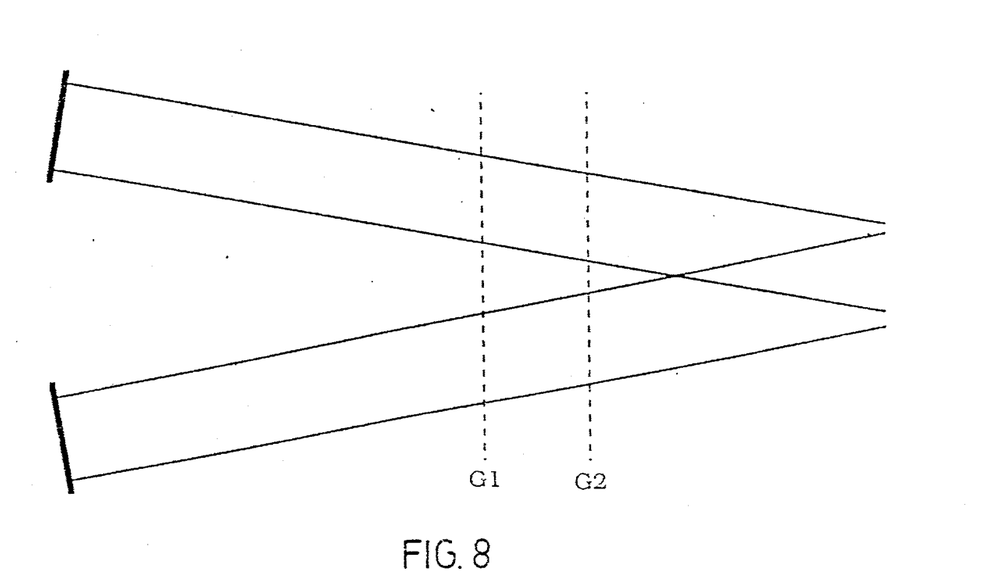

FIG. 7 shows fringe patterns obtained at various orientations. Here we used a cylindrical mirror or radius $r=4800$ mm and aperture $a=50$ mm. The reason for choosing such a large R-number was the necessity of measuring an object placed several meters away. The resolution of the twist motion turned out to be around 1 arc minute, which was adequate for the particular application. When no such constrains exist, angular displacements in the arc second range can be measured.

If two gratings are placed exactly parallel to one axis (say vertical), then the measurement is absolute, namely the result is the orientation of the cylinder axis relative to that particular axis. No reference measurement of an object of a known orientation must be taken to define the origin of the angular motion. Such a relatively absolute measurement can also be made with the other two axes provided one can align the two gratings exactly behind one another so that the fringe situation at $\phi_x=0$ is known.

The three dimensional autocollimator described herein measures all three rotations using a single collimated beam and a single (cylindrical) mirror. The tilt $\phi_x$ is measured from the average fringe shift while the twist $\alpha$ is determined from the fringe density or orientation. The value of $\phi_y$ is determined by repeating the measurement with the two gratings rotated by 90°.

Inspection of Eq. 6 shows that in this configuration the fringe pattern is insensitive to $\alpha$. Alternatively, the cylinder could be placed with its axis oriented at 45° to x and y, in which case both grating orientations are sensitive to $\alpha$ (see Eq. 5). This configuration may be used to eliminate some systematic errors.

DESCRIPTION OF PREFERRED EMBODIMENTS

Figure 9:
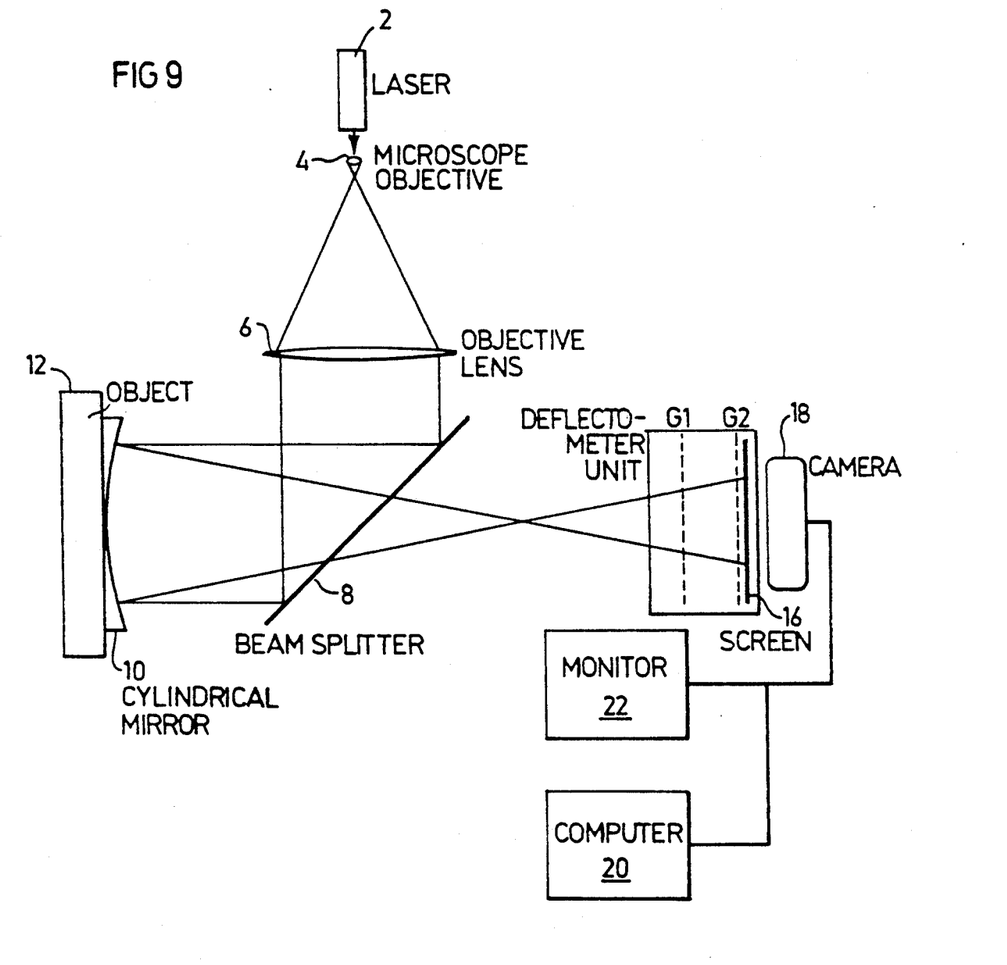
FIG. 9 is a diagram illustrating a complete apparatus constructed in accordance with the present invention.

The FIG. 9 Embodiment

FIG. 9 illustrates one form of apparatus constructed in accordance with the invention as described above. The illustrated apparatus includes a laser 2 which provides a beam of light first expanded by lens 4 and then collimated by lens 6 before directed through a beam splitter 8. The beam splitter reflects a portion of the light to a cylindrical mirror 10 carried by the object 12 whose orientation in space is to be measured. In the embodiment illustrated in FIG. 9, mirror 10 is a cylindrical mirror. It reflects the collimated beam back through the beam splitter 8 to a deflectometer unit 14 having two spaced gratings G1, G2 oriented perpendicular to the optical axis, and a screen 16 displaying the fringes produced by the two gratings.

The fringes appearing on screen 16 are viewed by a camera 18 which inputs this information into a computer 20. The sytem further includes a monitor 22 controlled by the computer.

The average fringe shift produced by the gratings G1, G2 is sensed by camera 18 and is introduced into computer 20 to compute the angle of the body with respect to one of the orthogonal axes. The fringe density or orientation is also sensed by camera 18 and introduced into computer 20 to compute the angle of the body with respect to the second orthogonal axis. When the two gratings G1, G2 are aligned exactly parallel with each other, an infinite fringe is produced, in which case the fringe density is measured. On the other hand, if the gratings are not aligned parallel with each other, a finite fringe is produced, in which case the fringe orientation is measured.

After the two angles have been determined as described above, the two gratings G1, G2 are rotated 90°, and the measurement of the fringe shift is repeated to determined the angle of the body with respect to the third orthogonal axis.

It will be appreciated that the instrument could be pre-calibrated with respect to an object whose position is known. This known position could then be used as a reference, and the average fringe shift could be determined by measuring the shift from that reference, in order to determine the absolute angle of the body with respect to the first orthogonal axis. When a computer is used, the computer can store the reference image, and therefore can produce absolute values during the operation of the apparatus.

Figure 10A:
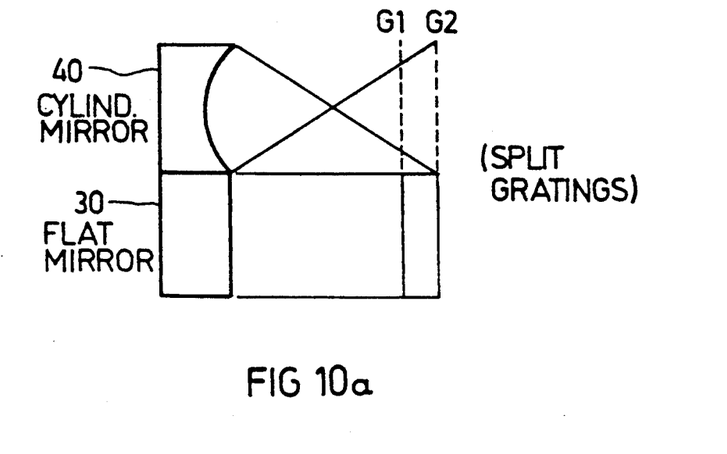
FIGS. 10a, 10b and 11 illustrate modifications in the apparatus of FIG. 9.
Figure 10B:
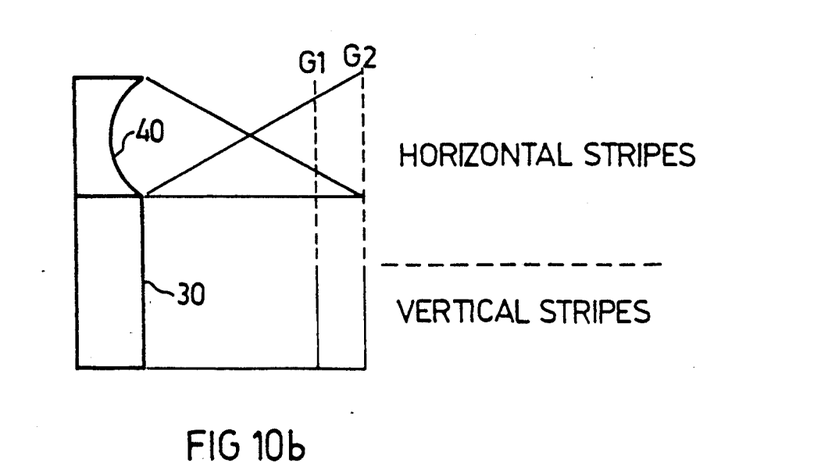
Figure 11:
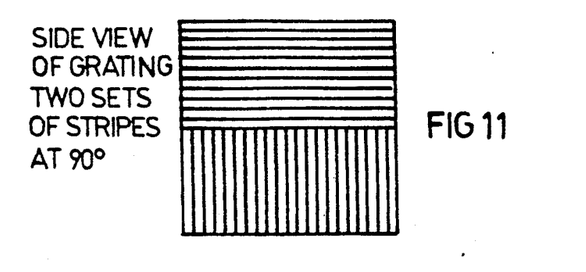

The FIGS. 10a, 10b and 11 Embodiments

FIGS. 10a and 10b illustrate an improvement over the setup just described by adding a flat mirror 30 next to the cylindrical mirror 40, which offers a better way of measuring $\phi_y$. The beam reflected from the flat mirror 30 intersects the grating plane at a different location. This arrangement eliminates the need to rotate the deflectometer 90°, since the stripes of the gratings in the sections corresponding to the flat mirror can be drawn perpendicularly to the other sections, as described below with respect to FIG. 11. Thus, all the information is available when examining different portions of a single frame. This is the preferred embodiment since it offers other advantages.

When the cylindrical mirror has a large curvature, the slopes in the y-direction are large, resulting in a very dense set of fringes when a measurement of $\phi_y$ is attempted. This situation forces a reduction in the sensitivity of the deflectometer until fringes are discernible. The flat mirror allows working at the same sensitivity as the other two directions. Using the flat mirror also for the determination of $\phi_x$ results in a complete separation of the measurement of $\phi_x$ and $\alpha$. This can be achieved by the setup shown in FIG. 10b.

FIG. 11 illustrates a simpler and less expensive arrangement which employs two flat mirrors in place of the cylindrical mirror. Imagine that the outer positions of the above cylindrical mirror are cut from the main body and flattened out. In the finite fringe mode the fringes do not tilt as a function of $\alpha$, but rather move in opposite directions, just like the outer portions of the corresponding fringe in the cylindrical situation. If the centers of the mirrors are separated by a distance s, then (see Eq. 8) the fringes will move up or down through a distance, $$\frac{\Delta y}{} = \frac{s \alpha d}{r \theta} \quad (10)$$

A tilt $\phi_x$ causes the fringes to move in the same direction as before. Thus monitoring the fringe shifts in the two mirrors makes possible the separation of the motions through a simultaneous solution of two linear equations. The disadvantage of this arrangement is that fringes have to be counted during rotation, whereas the cylindrical case allows determination of the twist of a stationary object placed at an arbitrary angle.

Other Variations

The measurements of the tilt angles, $\phi_x$ and $\phi_y$, however, still suffer from this disadvantage. There are several solutions to this problem.

One solution exploits the tunable sensitivity of the moire deflectometer. Taking two or more moire patterns of the same object at different sensitivities makes possible a unique determination of all three angles using Eqs. 3 and 8 with the different $\Delta y$'s. A second solution employs gratings with sections having different pitches. In these two methods, a second coarse measurement is taken at a lower sensitivity which produces less than one fringe shift throughout the dynamic range. Note that the second measurement requires a much lower accuracy, since the high accuracy is attained from the measurement taken at high sensitivity. The simplest method for coarse measurement is monitoring the lateral and angular shift of the object itself as seen on the monitor. A change of a few pixels can be easily detected and provides sufficient accuracy.

The principle of operation of the invention is based on the measurement of a single component of ray deflections. This goal can be achieved also by replacing the deflectometer unit (including the two gratings) by other means of detecting directional angular displacements. Examples of deflection sensitive instruments of the other types include shearing interferometers and spatial filtering systems such as schlieren and Ronchi tests. Instruments which are sensitive to the diretional curvature (partial second derivative) of the cylindrical mirror may also be used. The invention therefore covers these and other devices for the detection of partial derivatives.

Further, instead of using a cylindrical mirror, or two flat mirrors as discussed above, other non-axially-symmetrical mirror means, such as ellipsoidal mirrors or astigmatic mirrors, may be used. Still other variations, modifications and applications of the invention will be apparent.

What is claimed is:

1. A method of measuring the orientation of a body in space with respect to first, second and third orthogonal axes, comprising:
   projecting a collimated beam of light onto non-axially-symmetrical mirror means carried by said body in space;
   directing the light beam reflected from said mirror means through a deflectometer having two spaced gratings perpendicular to the optical axis;
   and measuring beam deflections or curvatures about said three axes to determine the orientation of the body in space with respect to said three axes;
   said measuring of the beam deflections or curvatures being effected by:
   measuring the average fringe shift to determine the angle of the body with respect to said first orthogonal axis;
   measuring the fringe density or orientation to determine the angle of the body with respect to said second orthogonal axis;
   rotating two gratings 90°; and
   repeating the measurement of the fringe shift to determine the angle of the body with respect to said third orthogonal axis.

2. The method according to claim 1, wherein said mirror means comprises a cylindrical mirror.

3. The method according to claim 1, wherein said mirror means comprises an ellipsoidal mirror.

4. The method according to claim 1, wherein said mirror means comprises an astigmatic mirror.

5. The method according to claim 1, wherein the mirror means includes a cylindrical mirror and a flat mirror adjacent thereto.

6. Apparatus for measuring the orientation of a body in space with respect to first, second and third orthogonal axes, comprising:
   non-axially-symmetrical mirror means carried by said object;
   an instrument for measuring beam deflections or curvatures;
   projecting means for projecting a collimated beam of light onto said non-axially-symmetrical mirror means;
   means for directing the light beam reflected from said mirror means to said instrument for measuring beam deflections or curvatures;
   and computing means for computing from the measured beam deflections or curvatures about said three axes to determine the orientation of the body in space with respect to said three axes;
   said instrument being a deflectometer having two spaced gratings perpendicular to the optical axis and including:
   means for measuring the average fringe shift to determine the angle of the body with respect to said first orthogonal axis;
   means for measuring the fringe density or orientation to determine the angle of the body with respect to said second orthogonal axis;
   and means for rotating said two gratings 90°, to enable repeating the measurement of the fringe shift to determine the angle of the body with respect to said third orthogonal axis.

7. The apparatus according to claim 6, wherein said mirror means comprises a cylindrical mirror.

8. The apparatus according to claim 6, wherein said mirror means comprises an ellipsoidal mirror.

9. The apparatus according to claim 6, wherein said mirror means comprises an astigmatic mirror.

10. The apparatus according to claim 6, wherein the mirror means includes a cylindrical mirror and a flat mirror adjacent thereto.

11. Apparatus for measuring the orientation of the body in space with respect to first, second and third orthogonal axes, comprising:
    non-axially-symmetrical mirror means carried by said object;
    a deflectometer having two spaced gratings perpendicular to the optical axis for measuring beam deflections or curvatures;
    projecting means for projecting a collimated beam of light onto said non-axially-symmetrical mirror means;
    means for directing the light beam reflected from said mirror means to said instrument for measuring beam deflections or curvatures;
    computing means for computing from the measured beam deflections or curvatures about said three axes to determine the orientation of the body in space with respect to said three axes;
    means for measuring the average fringe shift to determine the angle of the body with respect to said first orthogonal axis;
    means for measuring the fringe density or orientation to determine the angle of the body with respect to said second orthogonal axis;
    and means for rotating two gratings 90°, to enable repeating the measurement of the fringe shift to determine the angle of the body with respect to said third orthogonal axis.

12. The apparatus according to claim 11, wherein said mirror means comprises a cylindrical mirror.

13. The apparatus according to claim 11, wherein said mirror means comprises an ellipsoidal mirror.

14. The apparatus according to claim 11, wherein said mirror means comprises an astigmatic mirror.

15. The apparatus according to claim 11, wherein the mirror means includes a cylindrical mirror and a flat mirror adjacent thereto.

* * * * *